United States Patent [19]

Sugimoto et al.

[11] Patent Number: 5,526,023

[45] Date of Patent: Jun. 11, 1996

[54] PEN INPUT AND OUTPUT UNIT

[75] Inventors: Yuuji Sugimoto, Hokkaido; Tadasahi Yanagi, Kanagawa-ken; Tatuyoshi Ikuta, Kanagawa-ken; Hiroyuki Furuichi, Kanagawa-ken, all of Japan

[73] Assignee: Mutoh Industries, Ltd., Tokyo, Japan

[21] Appl. No.: 394,329

[22] Filed: Feb. 24, 1995

Related U.S. Application Data

[63] Continuation of Ser. No. 115,147, Sep. 2, 1993, abandoned.

[30] Foreign Application Priority Data

Sep. 14, 1992 [JP] Japan ..................................... 4-270911

[51] Int. Cl.$^6$ ..................................................... G09G 5/00
[52] U.S. Cl. ........................... 345/173; 345/179; 345/156; 382/187
[58] Field of Search ..................................... 345/156, 173, 345/179, 180, 181, 182, 183, 902, 123; 382/13; 178/19, 18

[56] References Cited

U.S. PATENT DOCUMENTS

| 5,166,666 | 11/1992 | Tanaka | 382/13 |
| 5,285,506 | 2/1994 | Crooks | 382/13 |
| 5,347,295 | 9/1994 | Agulnick | 345/156 |

FOREIGN PATENT DOCUMENTS

| 62-14225 | 1/1987 | Japan . |
| 62-241020 | 10/1987 | Japan . |

OTHER PUBLICATIONS

"Microsoft Windows" 1985–1990. pp. 22 and 47. Microsoft Corporation.

Primary Examiner—Richard Hjerpe
Assistant Examiner—Kent Chang
Attorney, Agent, or Firm—Lowe, Price, LeBlanc & Becker

[57] ABSTRACT

In a pen input and output unit for inputting data by contacting a pen on an input surface of a tablet device and for displaying the input data, display data is updated by detecting that the pen is traveled by a predetermined distance while the pen is in contact with the input surface of the tablet device. The display data can continuously be updated by sliding, reciprocally traveling, circulating or the like the pen on the input surface.

3 Claims, 5 Drawing Sheets

WARD : 1    BED : 3    AGE : 30    SEX : MALE
NAME : TARO SUZUKI    BLOOD TYPE : Rh(+)AB

| | | JULY | 17 | | | |
|---|---|---|---|---|---|---|
| NO. | TIME | TEMPER-ATURE | BLOOD PRESSURE (H) | BLOOD PRESSURE (L) | PULSE | BREATH |
| 1 | 06:00 | 36.5 | 120 | 80 | 70 | 22 |
| 2 | 10:30 | 36.8 | 125 | 75 | 65 | 20 |
| 3* | | | | | | |
| 4 | | | | | | |
| 5 | | | | | | |
| 6 | | | | | | |
| 7 | | | | | | |

| | | ▲ | ▲ | ▲ | ▲ | ▲ | ▲ |
|---|---|---|---|---|---|---|---|
| HOUR | ▲ ▼ | 36.5 | 115 | 65 | 65 | 25 |
| | | 36.4 | 114 | 64 | 64 | 24 |
| MINUTE | ▲ ▼ | 36.3 | 113 | 63 | 63 | 23 |
| | | 36.2 | 112 | 62 | 62 | 22 |
| | | 36.1 | 111 | 61 | 61 | 21 |
| | | 36.0 | 110 | 60 | 60 | 20 |
| | | 35.9 | 109 | 59 | 59 | 19 |
| | | 35.8 | 108 | 58 | 58 | 18 |
| | | 35.7 | 107 | 57 | 57 | 17 |
| | | 35.6 | 106 | 56 | 56 | 16 |
| | | 35.5 | 105 | 55 | 55 | 15 |
| | CLEAR | ▼ | ▼ | ▼ | ▼ | ▼ |

| REGISTRATION | PREVIOUS DAY | NEXT DAY | JOB SELECT |
|---|---|---|---|
| PATIENT DATA | PATIENT SELECT | WARD LIST | WARD SELECT |

PEN INPUT AND OUTPUT UNIT

This application is a continuation of application Ser. No. 08/115,147 filed Sept. 2, 1993 now abandoned.

BACKGROUND OF THE INVENTION

1. Field of the Invention

The present invention relates to a pen input and output (I/O) unit for inputting data by touching or contacting an input surface of a tablet device with a pen (stylus) and for displaying the input data on a display device.

2. Related Art

A pen I/O unit such as a pen computer using, as an input device, a tablet device in which a tablet and a display device are integrated, and a pen cooperated with the tablet device, has been known. In such a pen computer, when a desired numeric value is input, it is often performed that a numeric value displayed on the display device is counted up or down with a predetermined input operation to obtain the desired value. As the predetermined input operation, two major methods are used. In the first method, an operator repetitively touches an input area of the tablet device with the pen a predetermined number of times. The number of the contacts are counted and the counted value is input to a central processing unit (CPU). In the second method, displayed data is continuously updated depending on a time period during which the pen is continuously in contact with the input area.

However, in the first method, the pen must repetitively be contacted to the input surface of the tablet device. Fine wiring patterns in the tablet, the display device and the pen are liable to break due to mechanical shocks caused by the contact. Further, the input operation is troublesome, and the sound caused by the pen contacting with the tablet is harsh.

In the second method, when a speed of updating the displayed value is too fast, the desired value may be surpassed. In order to correct the displayed value, a further update operation in a reverse direction is required. Accordingly, it is difficult to obtain the desired value at once. On the contrary, when a speed of updating the displayed value is too slow, it is time-consuming to get a desired value.

SUMMARY OF THE INVENTION

An object of the present invention is to provide a pen input and output unit with a good operability which can update display data with an arbitrary speed and which can prevent the harsh contact sound and the poor reliability.

According to the present invention, a pen input and output unit for inputting data by contacting a pen with an input surface of a tablet device and for displaying input data on a display device, comprises contact detecting means for detecting that the pen is in contact with the input surface of the tablet device; travel detecting means for detecting that the pen travels by a predetermined distance while the pen is in contact with the input surface; and updating means for updating displayed data when the travel detecting means detects that the pen travels by the predetermined distance.

According to the pen input and output unit of the present invention, the display data is updated each time the pen travels on the input surface of the tablet device by a predetermined distance. Accordingly, the display data can continuously be updated by the input operation such as sliding in one direction, traveling reciprocally, and circulating the pen on the input surface. The speed of updating the display data depends on the travel speed of the pen. For this reason, an operator can arbitrarily select the update speed of the displayed data. Further, since the pen must not be contacted with the input surface several times, the reliability and the operability can be improved and the harsh contact sound can be eliminated.

BRIEF DESCRIPTION OF THE DRAWINGS

FIG. 4 is a view showing an example of an input screen displayed on an input surface of a tablet device in the computer system of the embodiment;

DETAILED DESCRIPTION OF THE PREFERRED EMBODIMENT

An embodiment of the present invention will now be described with reference to the drawings.

Figure 1:
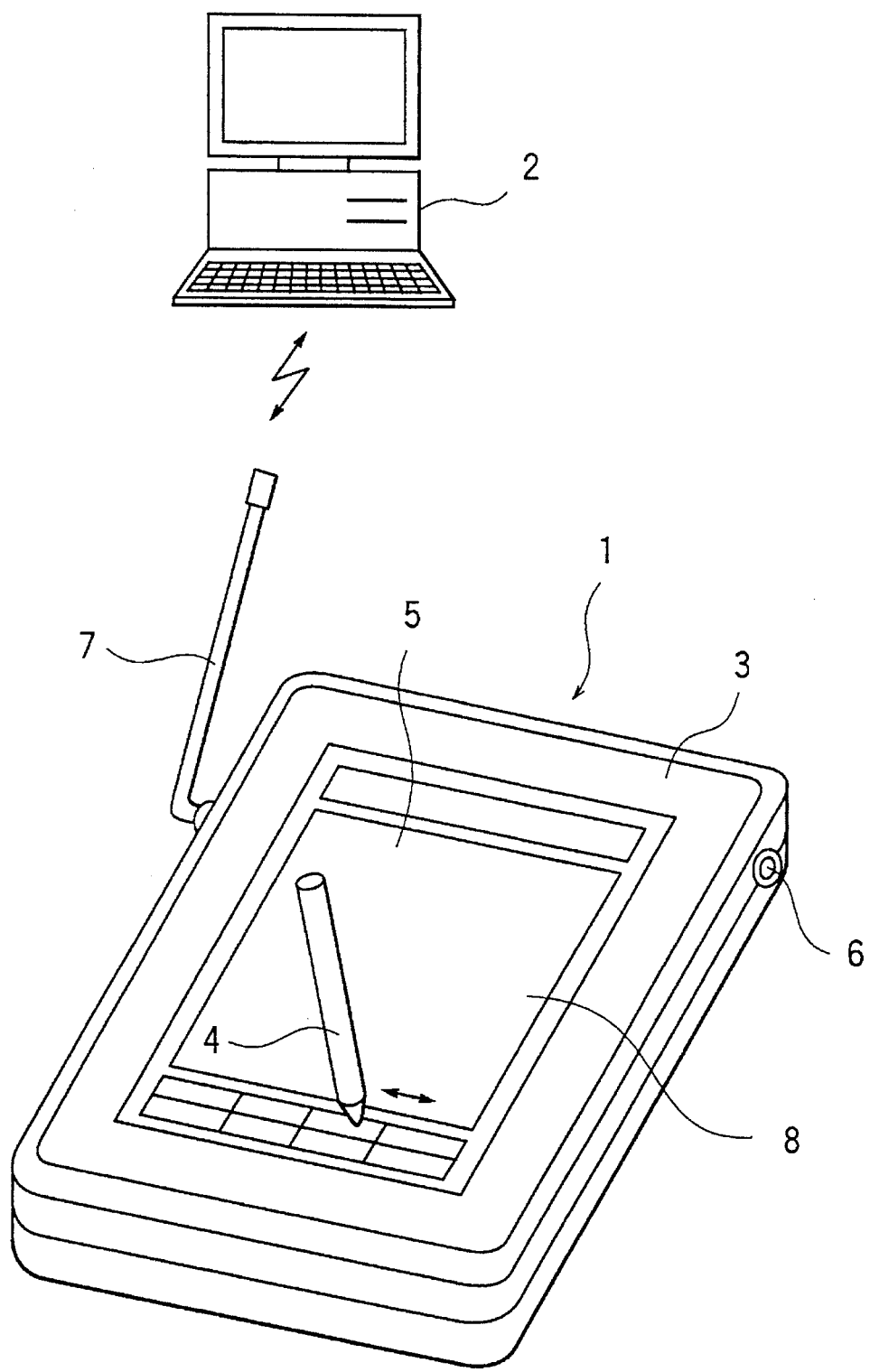
FIG. 1 is a view showing a configuration of a computer system according to an embodiment of the present invention.

FIG. 1 is a view showing a configuration of a computer system according to an embodiment of the present invention.

A pen input and output (I/O) unit 1 serving as a terminal equipment is connected to a host computer 2 through a radio communication and can arbitrarily transmit and receive necessary data to and from the host computer 2.

The pen I/O unit 1 includes a main body 3 and a pen (stylus) 4, and inputs necessary data by contacting with or sliding the pen 4 on the input surface 8 of a tablet device 5. The pen 4 is of a wireless type and can be housed within the main body 3 from a pen housing hole 6 formed at one side of the main body 3. At the opposite side of the main body 3 mounted is an antenna 7 for transmitting and receiving data to and from the host computer 2.

Figure 2:
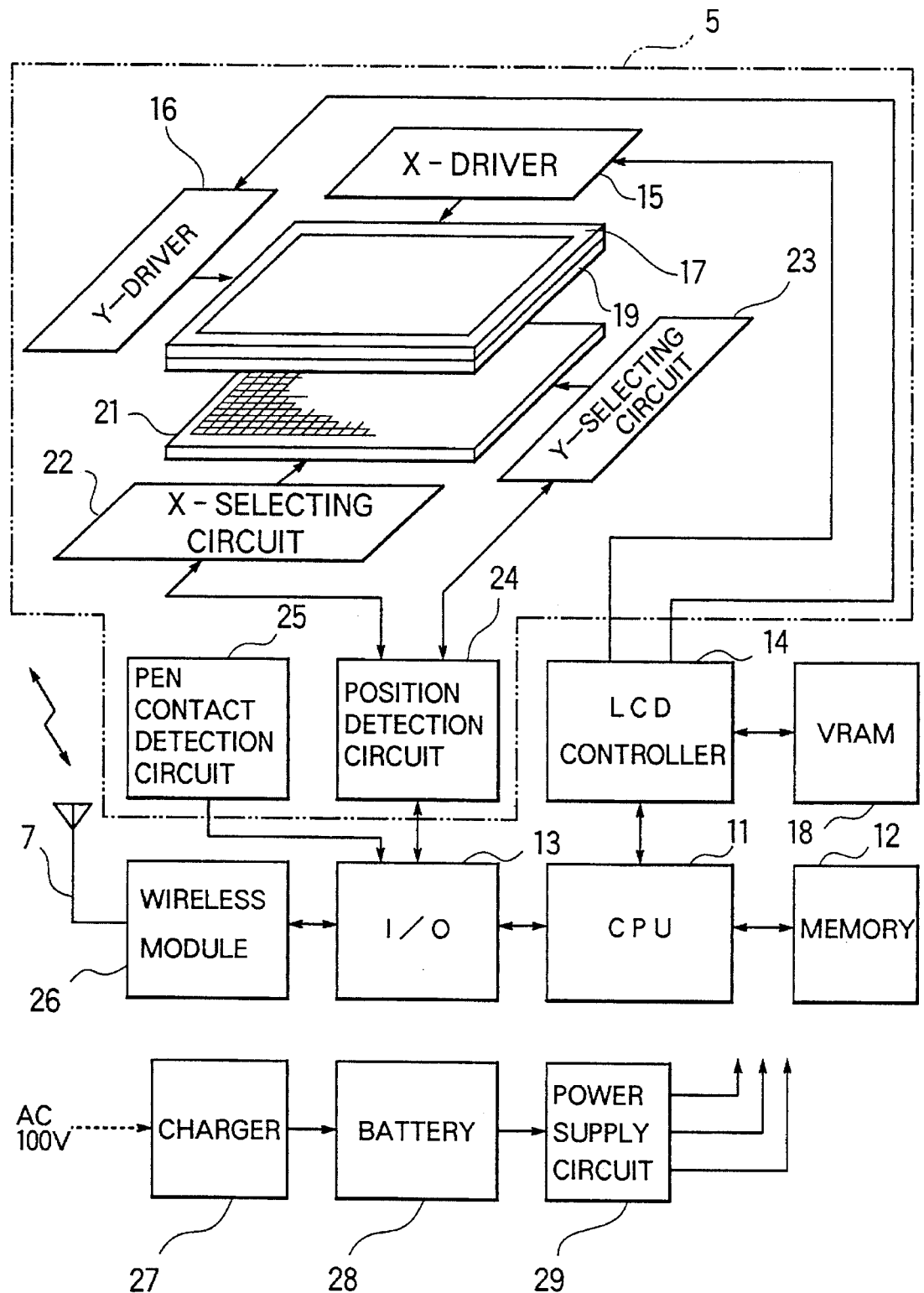
FIG. 2 is a block diagram showing a configuration of a pen input and output unit in the computer system of the embodiment.

FIG. 2 is a block diagram showing a configuration of the main body 3 of the pen I/O unit 1. A central processing unit (CPU) 11 controls the entire of the pen I/O unit 1. The CPU 11 is connected to a memory 12 for storing necessary data and program, an input and output interface 13 for inputting and outputting necessary data, and a liquid crystal display (LCD) controller 14.

The LCD controller 14 controls a display of an LCD display 17 through X and Y drivers 15 and 16. The display data forming a display screen of the LCD display 17 are stored in a video random access memory (VRAM) 18 and are read out serially by the LCD controller 14. The LCD display 17 is integrally overlaid with a back light device 19 and a tablet 21 for inputting coordinate values, and constitutes the tablet device 5 together with the drivers 15, 16, selecting circuits 22, 23, a position detection circuit 24, and a pen contact detection circuit 25. Accordingly, an operator can designate a desirable point in accordance with the displayed input screen to thereby display data, and can input data and instructions corresponding to the designated point.

Figure 3:
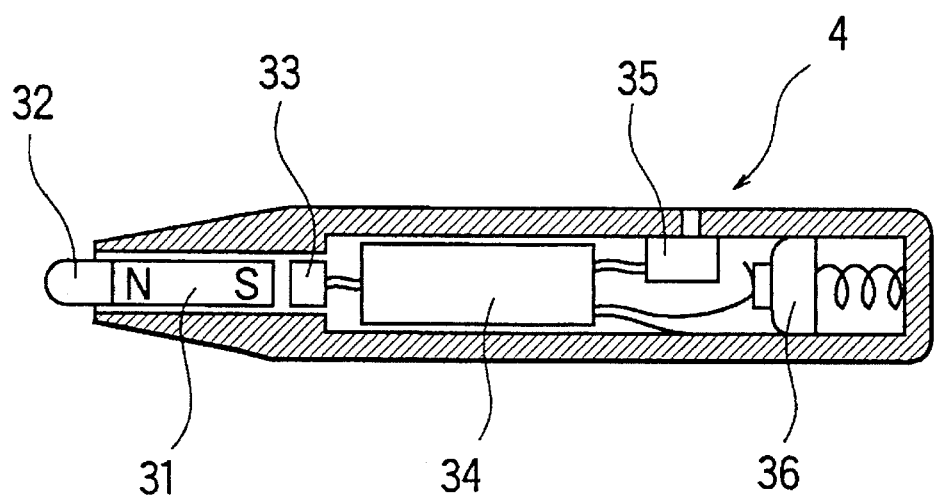
FIG. 3 is a view showing details of a pen of the computer system of the embodiment.

The tablet 21 is, for example, of an electromagnetic coupling type in which exciting lines and detecting lines are arranged in X and Y directions, respectively. As shown in detail in FIG. 3, the pen 4 incorporates a magnetic generator 31. The tablet 21 sequentially scans the exciting lines and the detecting lines by the X and Y selecting circuits 22 and 23, and detects changes in signal levels of the detecting lines due to a magnetic field from the magnetic generator 31 to thereby detect a position of the pen 4. Further, the pen 4 is provided with a switch 33 cooperating with a pen point portion 32. When the pen point portion 32 contacts or touch an object, the switch 33 is turns on so that a transmitter 34 transmits a ultrasonic wave through a piezoelectric transducer 35. A battery 36 supplies an electrical power to the transmitter 35 and the piezoelectric transducer 35. The ultrasonic wave transmitted from the pen 4 is received by the pen contact detection circuit 25 as a pen-touch signal.

The X and Y coordinate data of the pen contact position detected by the position detection circuit 24 and the pen-touch signal detected by the pen contact detection circuit 25 are supplied to the CPU 11 through the I/O interface 13.

Data, programs and commands output from the CPU 11 are transferred by radio communication to the host computer 2 through the I/O interface 13, a wireless module 26, and the antenna 7. Further, data, programs and commands from the host computer 2 are transmitted to the CPU 11 through the antenna 7, the wireless module 26 and the I/O interface 13.

In this embodiment, the pen I/O unit 1 is of a portable type which needs not a power supply cord, but of a rechargeable type. An externally supplied power is charged in a battery 28 serving as a secondary battery through a charger 27. The power charged in the battery 28 is stabilized by a power supply circuit 29 and then supplied to the various components.

An operation of updating date by the computer system constructed as described above will now be described.

FIG. 4 is a view showing an example of the input screen displayed on the input surface 8 of the tablet device 5.

In this example, the "date" 42 is being displayed in a portion of the input screen 41 and rectangular input areas 43, 44 and 45 including display data of "registration", "previous day", and "next day", respectively are being displayed on the other portion of the input screen 41.

According to the conventional method, when the date "Jul. 17, 1992" is to be changed to "Aug. 12, 1992", an operator must contact the pen point portion 26-times with the input area 45 in which the "previous date" is being displayed.

According to the system of the present embodiment, in addition to the above date-updating method, a method is adopted in which the pen 4 is slid in one direction or reciprocally, or circulated within the input area 45 while the pen 4 is being in contact with the input area 45, as shown in FIG. 1, to thereby sequentially update the date 42.

Figure 5:
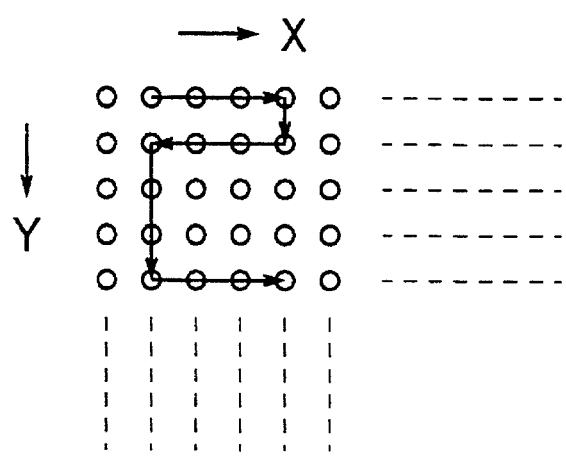
FIG. 5 is a view for explaining a method of detecting the travel of the pen in the computer system of the embodiment.

Such date-updating method is implemented by determining how many dots the pen 4 travels in the X or Y direction while the pen 4 is in contact with the input area, as shown in FIG. 5. If a resolution of the position detection of the input surface 8 is assumed to be 480 dots in the X direction and 640 dots in the Y direction, the "date" may desirably be updated each time the pen 4 travels approximately 3 dots. In this case, the CPU 11 executes the process as shown in FIG. 6.

Figure 6:
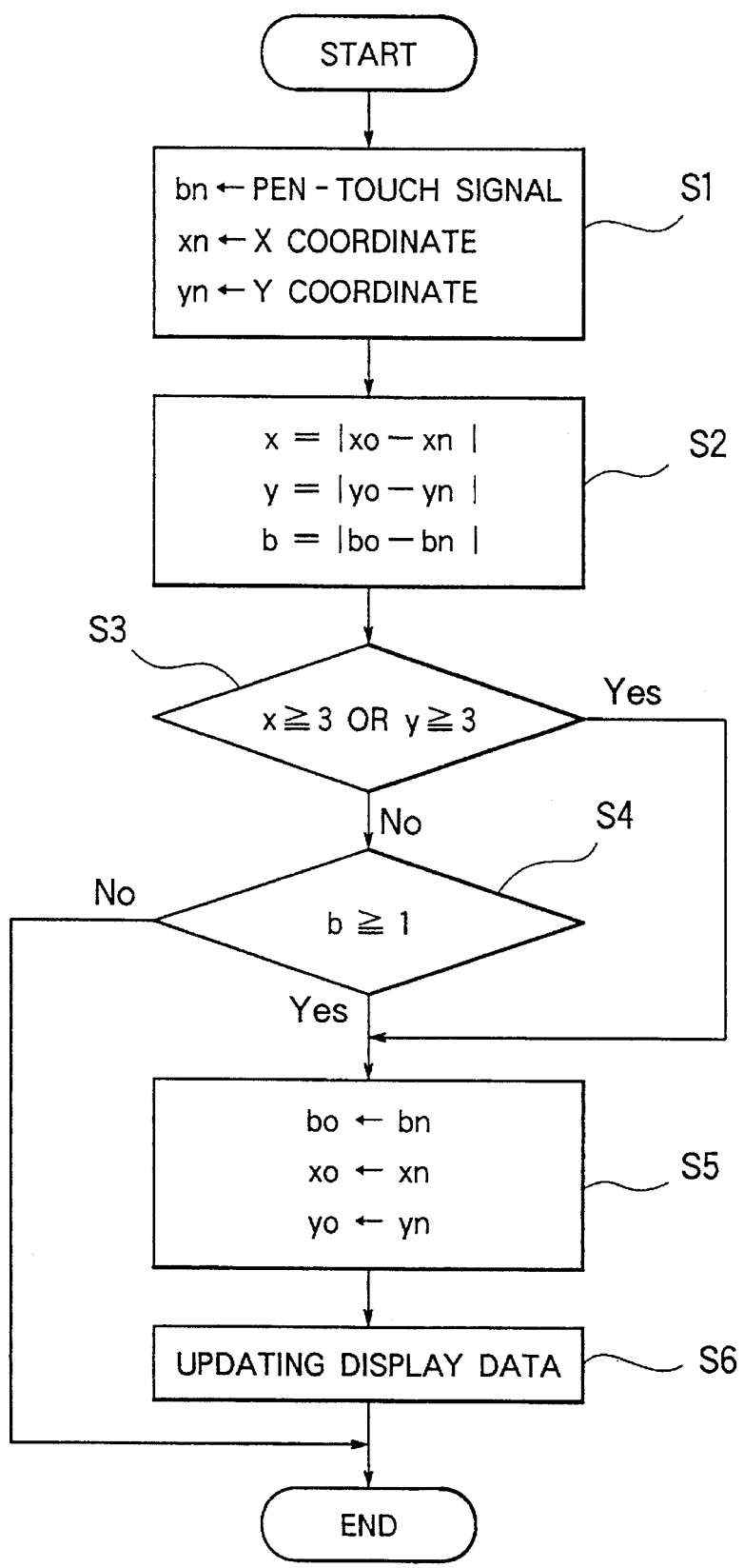
FIG. 6 is a flowchart showing a data update process in the computer system of the embodiment.

The process shown in FIG. 6 is executed by interrupting the CPU 11 with a predetermined interval when a pen-touch signal indicates the pen-touch state. In this example, the pen-touch signal will be "0" and "1" when the pen 4 is in the pen-touch state and non-pen-touch state, respectively.

First, upon detecting the pen-touch state, the CPU 11 fetches the X and Y coordinates from the position detection circuit 24 and stores the pen-touch signal, the X coordinate value, and the Y coordinate value in bn, xn, and yn, respectively (S1). The symbols bn, xn, and yn represent parameters in which new detected values (current values) are set. Then, the CPU 11 computes the absolute values of the differences between the previous values bo, xo, and yo and current values bn, xn, and yn of the pen-touch signals and coordinates (S2). If the difference between the previous and the current values of the coordinates is 3 or more (S3), or if the difference between the previous and current values of the pen-touch signals is 1 or more (S4), the current values of the pen-touch signal and the coordinates are set in the parameters bo, xo, and yo as the previous values (S5), and a predetermined process such as the date updating process is executed (S6).

According to the above-described process, the "date" is updated by sliding the pen 4 by 3 dots or more within the predetermined input area. Accordingly, the update process can be executed at an arbitrary speed by reciprocally traveling the pen 4 at an arbitrary speed. For this reason, the pen 4 must not be contacted frequently as in a conventional system so that an operation can be simplified. Furthermore, the harsh sound can be eliminated and the reliability can be improved.

The present invention is not limited to the above embodiment. In the above embodiment, the "date" update process is exemplified. The input method of the present invention can, however, be applied to update processes of other data, switching of display screen, scroll operation and the like.

Besides the above described type, the tablet device may be of various types such as an electrostatic coupling type, an electrode contact type, a piezoelectric type, and a conductive sheet type. Further, the present invention can be applied to a system wherein a display device and a tablet device are separately provided as well as to a pen input and output unit connected to a host computer through a cable.

As has been described above, according to the present invention, the display data is switched each time the pen travels by a predetermined distance on the input surface of the tablet device. Accordingly, the data and the display screen can be changed sequentially at an arbitrary speed by performing the input operation such as sliding, reciprocally traveling, or circulating the pen on the tablet device, for example. For this reason, an operability can be improved compared to the input operation in which data is updated by repetitively performing the pen-touch operation or by continuously touching the pen. Furthermore, the harsh sound can be eliminated and the reliability of the unit can be improved.

What is claimed is:

1. A pen input and output unit for inputting data by contacting a pen with an input surface of a tablet device and for displaying input data on a display device, comprising:

a tablet device having an input surface, including a predetermined input area and a display area for displaying data;

contact detecting means for detecting when a pen is in contact with said input surface of said tablet device;

travel distance detecting means for detecting when said pen has travelled a predetermined distance while said pen remains in contact with said input surface; and updating means for updating data displayed in said display area every time said travel distance detecting means detects that the pen has traveled a predetermined distance in said predetermined input area of said input surface, said predetermined distance being independent of any pattern of movement in which said pen has travelled while being in contact with said input surface, and said predetermined input area being spaced apart from said data display area.

2. The pen input and output unit according to claim 1, further comprising:

counting means for counting the number of times the pen contacts said input surface; and means for updating the displayed data based upon the number counted by said counting means.

3. A pen input and output unit comprising:

a tablet having an input surface;

means for detecting when a pen is in contact with said input surface and for determining a contact point of the pen on said input surface;

a display device provided on said tablet for displaying data to be updated in one fixed area of a display surface, and for identifying an input area in the another fixed area of said display surface, said input area defining an area in which instructions for updating the data to be updated can be entered;

travel detecting means for detecting when the pen travels on said input area of said input surface by a predetermined distance while the pen remains in contact with said input area of said input surface; and updating means for updating the data to be updated when said travel detecting means detects that the pen has travelled a predetermined distance on said input area, said predetermined distance being independent of any pattern of movement in which said pen has travelled while being in contact with said input surface.

* * * * *